United States Patent [19]

Chen

[11] Patent Number: 5,365,833
[45] Date of Patent: Nov. 22, 1994

[54] PIZZA BAKING PAN

[76] Inventor: Ming-Jing Chen, No. 29, Alley 39, Lane 206, Sec. 2, Tai-Ho Rd., Ah-Yi Li, Changhua City, Taiwan, Prov. of China

[21] Appl. No.: 207,060

[22] Filed: Mar. 8, 1994

[51] Int. Cl.⁵ ............................................. A21B 1/00
[52] U.S. Cl. ................................. 99/447; 99/401; 126/273 R; 126/273.5
[58] Field of Search ............... 126/27, 41 R, 273.5, 126/273 R, 275 R, 21 R; 99/446, 400, 401, 447, 449, DIG. 15

[56] References Cited

U.S. PATENT DOCUMENTS

| | | | |
|---|---|---|---|
| 2,001,615 | 5/1935 | Karten | 99/447 |
| 2,099,788 | 11/1937 | Ames | 99/447 |
| 4,378,729 | 4/1983 | Pierick | 126/275 R |
| 4,384,513 | 5/1983 | Pierick | 126/275 R |
| 4,640,265 | 2/1987 | Romo | 126/337 R |

*Primary Examiner*—James C. Yeung
*Attorney, Agent, or Firm*—Morton J. Rosenberg; David I. Klein

[57] ABSTRACT

A pizza baking pan includes a wok having a center through hole, a rack having an inside annular flange raised from a recessed center portion thereof and a plurality of vent holes around the border thereof surrounding the recessed center portion for passing heat, a ceramic baking plate supported on the inside annular flange inside the recessed center portion, and a dome cover covered on the rack over the ceramic baking plate and having a transparent lid in the center for viewing the inside of the pan.

1 Claim, 2 Drawing Sheets

PIZZA BAKING PAN

BACKGROUND OF THE INVENTION

The present invention relates to cooking utensils, and relates more particularly to a pizza baking pan for baking pizzas quickly and evenly.

Conventionally, iron plates are commonly used for baking pizzas. When an iron plate is used to bake a pizza, heat from the flame is directly transmitted through the iron plate to bake the pizza from the bottom. Because the pizza receives dry heat from the iron plate only, the bottom side of the pizza may be burned before it is well done. When the bottom side of the pizza is over-baked, the outer appearance as well as original taste of the pizza will be destroyed.

SUMMARY OF THE INVENTION

The present invention provides a pizza baking pan which eliminates the aforesaid problems. According to the preferred embodiment of the present invention, the pizza baking pan comprises a wok having a center through hole, a rack having an inside annular flange raised from a recessed center portion thereof and a plurality of vent holes around the border thereof surrounding the recessed center portion for passing heat, a ceramic baking plate supported on the inside annular flange inside the recessed center portion, and a dome cover covered on the rack over the ceramic baking plate and having a transparent lid in the center for viewing the inside of the pan. During the baking process, dry heat from the flame is partially transmitted through the ceramic baking plate to bake the bottom side of the pizza, and partially passes through the vent holes on the rack to heat the top side of the pizza, and therefore the pizza can be baked quickly and evenly.

DETAILED DESCRIPTION OF THE PREFERRED EMBODIMENT

Figure 1:
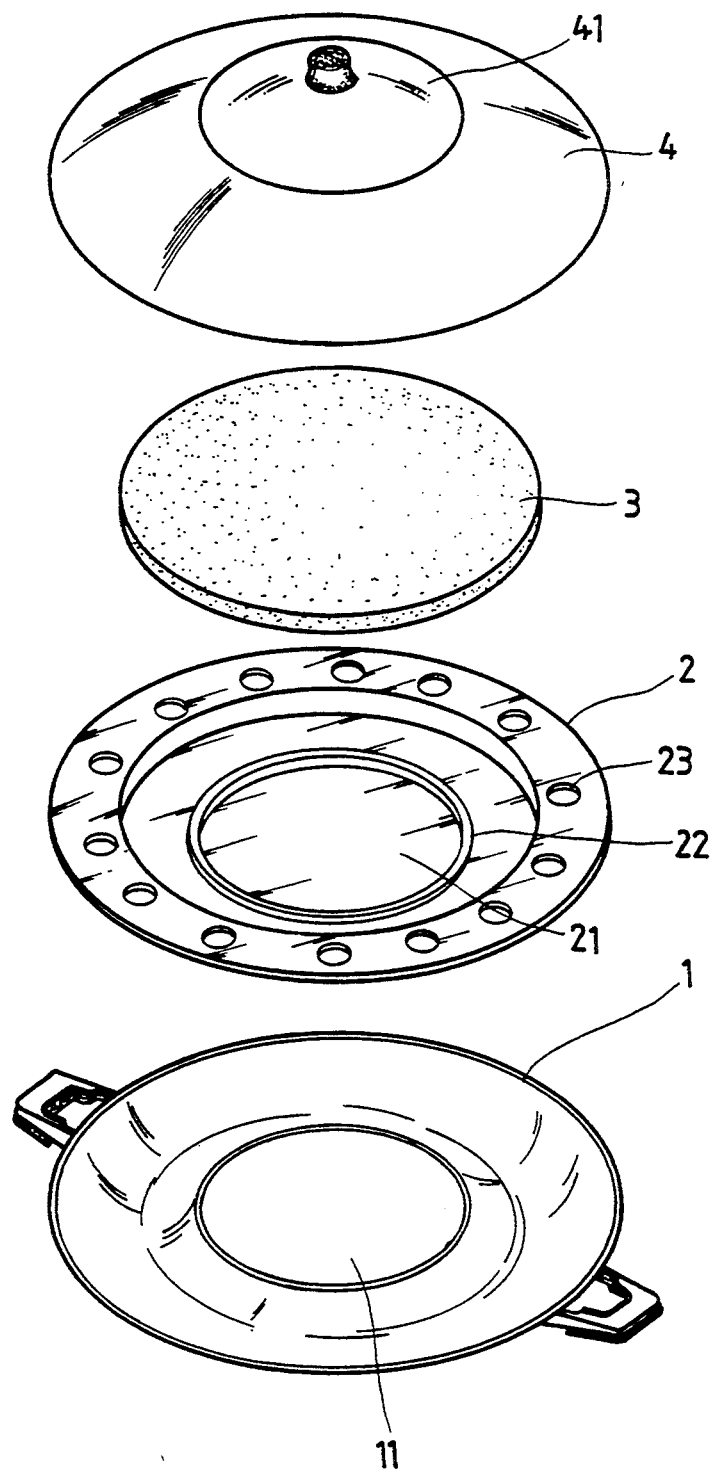
FIG. 1 is an exploded view of a pizza baking pan according to the preferred embodiment of the present invention.
Figure 3:
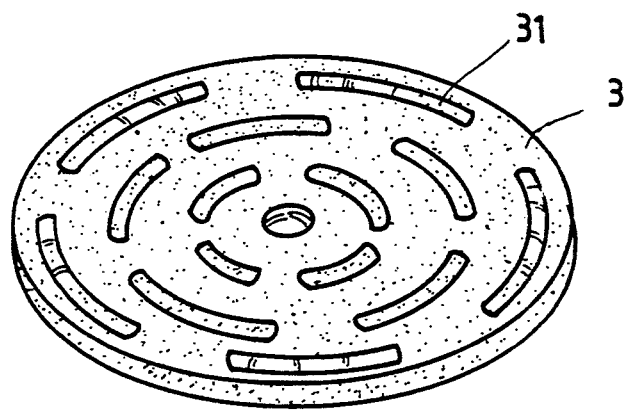
FIG. 3 is an elevational view showing the back side of the ceramic baking plate of the pizza baking pan of FIG. 1.
Figure 2:
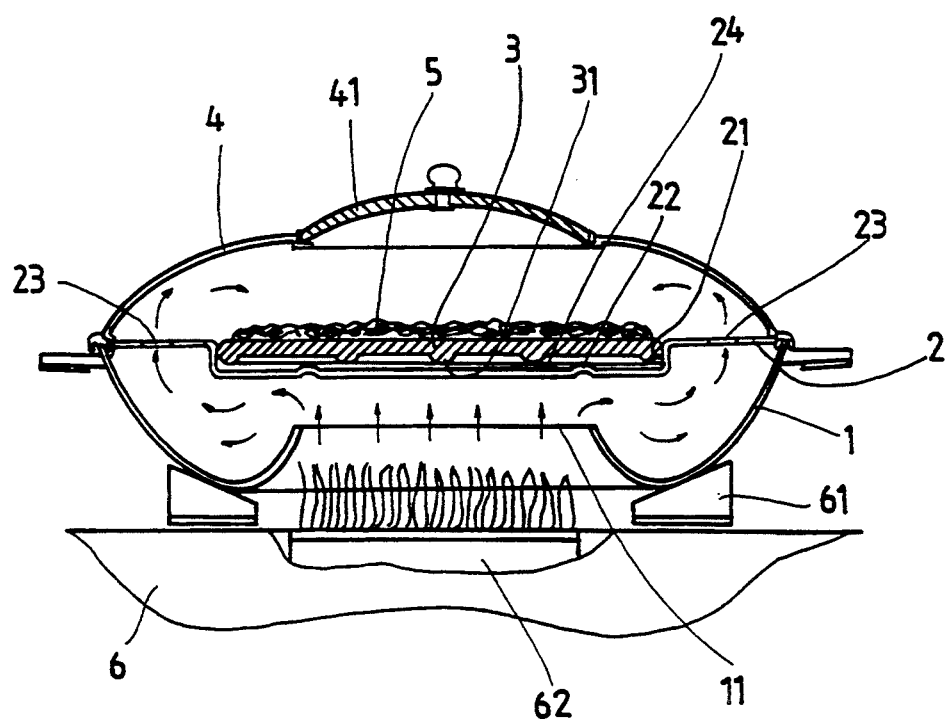
FIG. 2 is a sectional view showing the pizza baking pan mounted on a stove and heated.

Referring to FIGS. 1 and 2, a pizza baking pan in accordance with the preferred embodiment of the present invention is generally comprised of a wok 1, a rack 2, a ceramic baking plate 3, and a dome cover 4. The wok 1 has a circular through hole 11 in the center at an elevation above the lowest bottom edge thereof. The rack 2 is supported on the wok 1 at the top, having a recessed center portion 21 corresponding to the circular through hole 11 on the wok 1, an inside annular flange 22 raised from the recessed center portion 21, and a plurality of vent holes 23 spaced around the recessed center portion 21 at a higher elevation than the recessed center portion 21. The ceramic baking plate 3 as show in FIG. 3 has a plurality of curved, raised ribs 31 on the back side thereof supported on the inside annular flange 22 and spaced above the recessed center portion 21 by a space 24. The dome cover 4 covers on the rack 2 over the ceramic baking plate 3, having a transparent lid 41 in the center through which the inside of the pizza baking pan is viewed.

Referring to FIG. 2 again, when the stove 6 is turned on, dry heat from the flames produced by the flame nozzles 62 of the stove 6 passes through the circular through hole 11 on the wok 1 to heat the recessed center portion 21 of the rack 2 causing currents of hot air distributed in all directions in the space 24, and therefore the ceramic baking plate 3 is evenly heated to bake the pizza 5. At the same time, dry heat from the flames produced by the flame nozzles 62 partially passes through the vent holes 23 to heat the upper part of the pizza 5. Therefore, the pizza 5 is baked quickly and evenly.

What is claimed is:

1. A pizza baking pan comprising:

a wok having a circular through hole formed in a center section of a bottom of said wok at an elevation above a lowest portion of said bottom of said wok, said wok having a circular top edge;

a circular, solid rack supported on said top edge of said wok, said solid rack having (1) a recessed center portion disposed above the circular through hole of said wok, (2) an inside annular flange raised from said recessed center portion, and (3) a plurality of vent holes spaced around said recessed center portion at a higher elevation than said recessed center portion;

a ceramic baking plate received in the recessed center portion on said rack for baking pizzas, said ceramic baking plate having a plurality of curved, raised ribs on a bottom surface thereof supported on the inside annular flange of said rack and spaced above the recessed center portion of said rack by a space; and a dome cover covering said rack over said ceramic baking plate, said dome cover having a transparent lid disposed in a center portion thereof for viewing the inside of the pizza baking pan.

* * * * *